May 18, 1926.
F. C. MARSHALL
VALVE MECHANISM FOR COMPRESSORS
Filed June 26, 1923     2 Sheets-Sheet 1
1,584,787
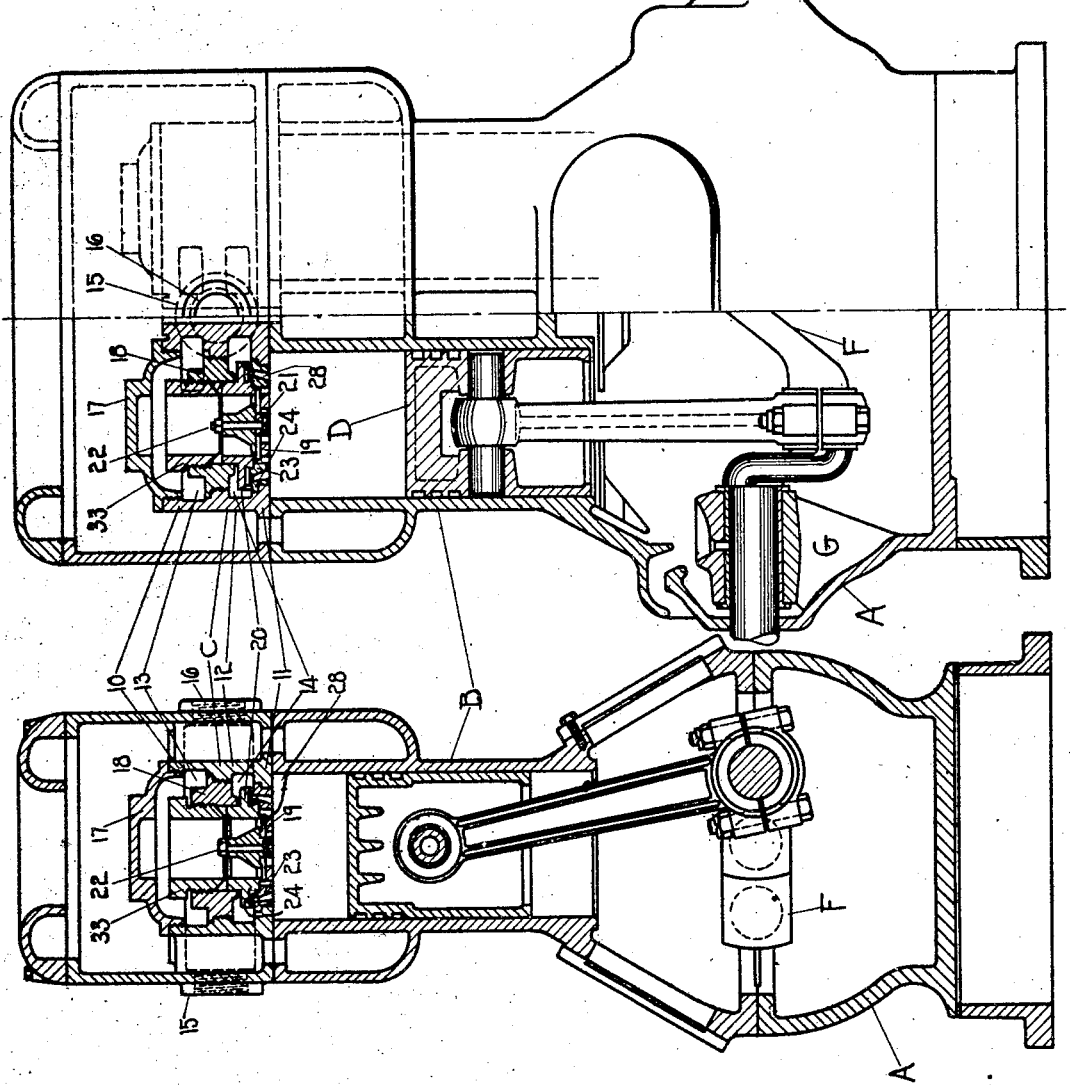
INVENTOR.
FRANCIS C. MARSHALL
BY
ATTORNEYS.

May 18, 1926. 1,584,787
F. C. MARSHALL
VALVE MECHANISM FOR COMPRESSORS
Filed June 26, 1923   2 Sheets-Sheet 2
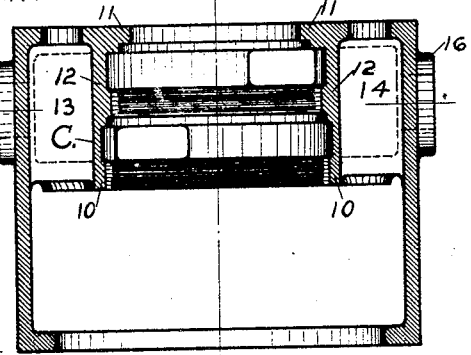
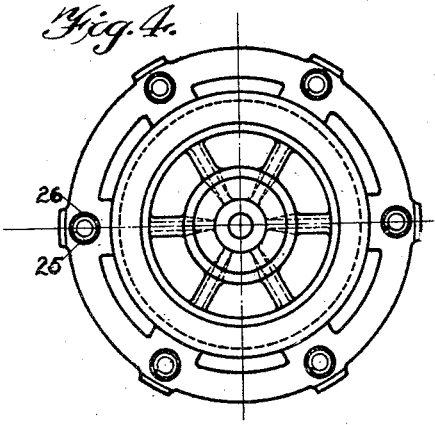
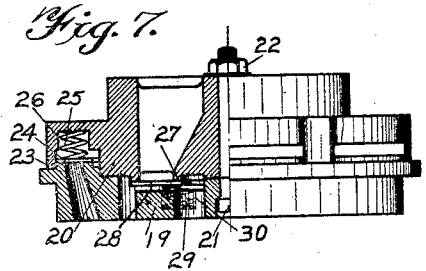
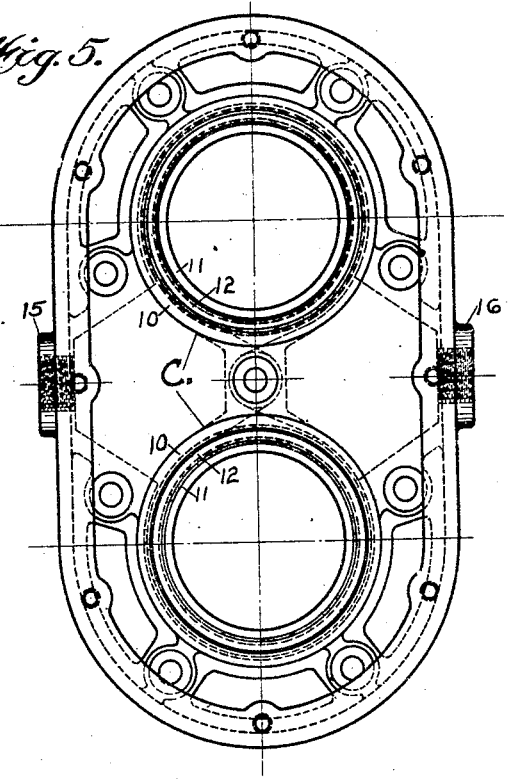
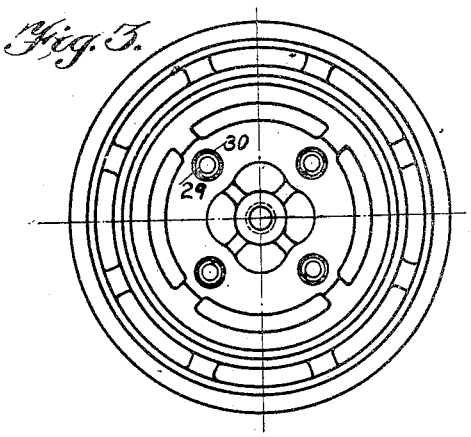
INVENTOR.
FRANCIS C. MARSHALL
BY
ATTORNEYS.

Patented May 18, 1926.

1,584,787

UNITED STATES PATENT OFFICE.

FRANCIS C. MARSHALL, OF GREEN BAY, WISCONSIN, ASSIGNOR TO C. A. LAWTON CO., OF DE PERE, WISCONSIN.

VALVE MECHANISM FOR COMPRESSORS.

Application filed June 26, 1923. Serial No. 647,891.

The invention relates to a valve construction, and more particularly to the class of valve assemblies for air compressors.

The primary object of the invention is the provision of a valve construction, of this character, wherein the assembly constitutes a single set for use in one cylinder of the compressor, instead of two sets of valve mechanism, as is required in the ordinary air compressor, where the inlet and outlet valves are separate mechanisms.

Another object of the invention is the provision of a valve construction of this character, wherein the parts thereof are of novel form and assembled in a manner to occupy the least possible space, there being few parts in the assembly, thus enabling the valve construction to be introduced into and removed from the cylinder of the compressor in the least possible time, and with little exertion.

A further object of the invention is the provision of a valve construction of this character, wherein the inlet and outlet valve parts are assembled to constitute a unit as they are enclosed in the same valve cage members or chest.

A still further object of the invention is the provision of a valve construction, of this character, wherein minimum area of space is required for the opening and closing of the valves controlling the inlet and outlet ports of the compressor, and thus making it possible to place same in a position where the openings occur in a space, which is not greater than the diameter of the cylinder of the compressor, and thereby eliminating the making of an offset port in the side of the cylinder for the valves or place one of the valves in the piston, as is usual with the ordinary air compressors.

A still further object of the invention is the provision of a valve construction of this character, which is extremely simple in construction, readily and easily assembled, introduced into and removed from the cylinder of the air compressor, thoroughly reliable and efficient in operation, eliminating excessive pumping of oil by the piston in the cylinder, increasing the efficiency of the compressor in its operation, and comparatively inexpensive to manufacture and install.

With these and other objects in view the invention consists in the features of construction, combination and arrangements of parts as will be hereinafter fully described, illustrated in the accompanying drawings, and pointed out in the claims hereunto appended.

In the accompanying drawings:

Figure 1 is a fragmentary sectional elevation of an air compressor showing the valve mechanism constructed in accordance with the invention assembled and in position within the cylinder of the compressor.

Figure 2 is a similar view taken approximately at right angles thereto.

Figure 3 is a plan view of one of the valve seats.

Figure 4 is a similar view of the other valve seat.

Figure 5 is a plan view of the cylinder head of the compressor.

Figure 6 is an enlarged sectional view through the cylinder head.

Figure 7 a side elevation partly in section of the valve cage members, assembled with valves and springs.

Figure 8 is an enlarged fragmentary sectional view of the cylinder head and valve mechanism.

Similar reference characters indicate corresponding parts throughout the several views in the drawings:

Referring to the drawings in detail, A, designates generally the body of the air compressor, having formed integrally therewith the vertical double cylinders B, provided with a removable head C, which may or may not have a water jacket or hopper at the option of the maker of the air compressor. In each cylinder B, is a reciprocating piston D, operated through the medium of a connecting rod E, and crank shaft F, the latter being journaled in the lower portion of the body A, of the said compressor. The lower portion of the body A, is formed with an oil chamber G, for lubricating the bearings for the shaft F, and other adjunct parts as usual.

The cylinder head C, between the top 10, and bottom 11, thereof is formed with an intermediate web or partition 12, to provide an upper air intake chamber 13, and a lower outlet or exhaust chamber 14, respectively, therein, and these chambers are common to both cylinders B, as will be apparent.

An air inlet port 15, is provided centrally in one side of the cylinder head C, while an exhaust port 16, is provided in the other side opposite thereto, and these open into the respective chambers 13 and 14.

Formed in the cylinder head C, in vertical alignment with each cylinder B, are the required sized openings, in the uppermost one, which is provided in the top 10, has removably threaded therein a closure cap or cover 17, while threaded in the intermediate opening is a dividing collar or plug 18, and in the lower opening is a lower valve cage member, 19, the latter being interfitted with an upper valve cage member 20, and these cages are held in place by a center bolt 21, and locking collar 22, the lower cage member being formed with a valve seat 23, for an annular outlet or discharge valve 24, which is made from relative thin material, and held seated through the medium of coiled expansion springs 25, counter seated at 26, in the upper valve cage member 20.

Formed on the upper valve cage member 20, is a valve seat 27, for an annular intake or inlet valve 28, which is also made from relatively thin material, and held seated through the medium of coiled expansion springs 29, counter seated at 30, in said lower valve cage member 19, the valve 24, being designed to control the outlet or discharge ports 31, and the valve 28, to control the inlet ports 32, formed in the lower valve cage member 19, which ports form communication between the cylinder B, and the chambers 13 and 14, respectively.

The upper valve cage member 20, is sealed in the dividing collar or plug 18, by a packing gland 33, which is removably and adjustably threaded in the said collar or plug.

It will be apparent that the discharge valve 24, is concentrically disposed relative to the inlet valve 28, and these valves are also immediately above and in a position concentric to the diameter of the cylinder B, to allow proper operation of said valves and permitting free passages of air in and out of the cylinder in a most direct line.

The gland 33, at its upper end is formed with a wrench engaging portion 34, while the lower end is tapered at 35, to act upon the packing ring 36, interposed between said gland 33, and the cage member 19, so as to prevent the leakage of air between these parts and the plug 18.

In the operation of the compressor, the air entering the inlet port 15, passes into the cylinder head C, into the inlet chamber 13, above the dividing plug 18, thence passing downwardly through the center of the gland 33, and upper valve cage member 20, against the inlet valve 28, forcing it from its seat 27, so that the air will be admitted into the cylinder B, through the inlet ports 32. As the piston D, rises in the cylinder B, the air therein is compressed and lifts the outlet valve 24, from its seat 23, permitting the compressed air to enter the discharge chamber 14, in the cylinder head C, and thence be delivered therefrom through the discharge outlet 16.

What is claimed is:

1. A valve mechanism for compressors, the combination of a cylinder head having an intermediate web to form an upper intake chamber and a lower outlet chamber, said head being formed with vertically aligned upper, intermediate, and lower openings, a closure cap detachably engaged in the upper opening, a dividing collar removably engaged in the intermediate opening, a two-part valve cage unit in the lower opening, means detachably securing the parts of the cage unit together, said cage unit having inlet and outlet ports concentrically arranged relative to each other and communicating with the respective chambers, valves controlling said ports, a packing gland removably held in the dividing collar, and a packing between the gland and upper part of the valve cage unit.

2. A valve mechanism for compressors, the combination of a cylinder head having an intermediate web to form an upper intake chamber and a lower outlet chamber, said head being formed with vertically aligned upper, intermediate, and lower openings, a closure cap detachably engaged in the upper opening, a dividing collar removably engaged in the intermediate opening, a two-part valve cage unit in the lower opening, means detachably securing the parts of the cage unit together, said cage unit having inlet and outlet ports concentrically arranged relative to each other and communicating with the respective chambers, valves controlling said ports, a packing gland removably held in the dividing collar, and a packing between the gland and upper part of the valve cage unit, the lower portion of the gland being tapered to act in compressing the packing against the cage unit and dividing collar to seal the joint therebetween.

In testimony hereof I affix my signature.

FRANCIS C. MARSHALL.